(12) United States Patent
Fessel

(10) Patent No.: US 11,182,086 B2
(45) Date of Patent: Nov. 23, 2021

(54) METHOD AND SYSTEM FOR APPLICATION-BASED MANAGEMENT OF USER DATA STORAGE RIGHTS

(71) Applicant: Cigent Technology, Inc., Fort Myers, FL (US)

(72) Inventor: Tony Edward Fessel, Fort Myers, FL (US)

(73) Assignee: CIGNET TECHNOLOGY, INC., Fort Myers, FL (US)

( * ) Notice: Subject to any disclaimer, the term of this patent is extended or adjusted under 35 U.S.C. 154(b) by 24 days.

(21) Appl. No.: 16/925,856

(22) Filed: Jul. 10, 2020

(65) Prior Publication Data

US 2021/0019062 A1 Jan. 21, 2021

Related U.S. Application Data

(60) Provisional application No. 62/876,011, filed on Jul. 19, 2019.

(51) Int. Cl.
*G06F 3/06* (2006.01)
*G06F 21/78* (2013.01)

(52) U.S. Cl.
CPC ............ *G06F 3/0622* (2013.01); *G06F 3/067* (2013.01); *G06F 3/0653* (2013.01); *G06F 3/0659* (2013.01); *G06F 21/78* (2013.01)

(58) Field of Classification Search
None
See application file for complete search history.

(56) References Cited

U.S. PATENT DOCUMENTS

| | | | |
|---|---|---|---|
| 6,820,168 B2 * | 11/2004 | Tanaka | G06F 3/0622 711/163 |
| 2004/0193909 A1 * | 9/2004 | Chang | G06F 21/6236 726/14 |
| 2005/0132054 A1 * | 6/2005 | Chang | G06F 21/6218 709/227 |
| 2008/0134347 A1 * | 6/2008 | Goyal | G06F 21/6209 726/29 |
| 2009/0222914 A1 * | 9/2009 | Ozawa | G06F 21/62 726/21 |

(Continued)

Primary Examiner — Edward J Dudek, Jr.
Assistant Examiner — Ralph A Verderamo, III
(74) Attorney, Agent, or Firm — Buchanan Ingersoll & Rooney PC

(57) ABSTRACT

A method for controlling access to data storage based on application rights dictating usage ability of a user includes: receiving, by a first application of a computing device, a data access request from a second application of the computing device, the data access request including a user identifier, namespace identifier, application identifier associated with the second application, and data command; verifying data access authorization for a user of the second application and for the second application program based on a first permission stored in an application-application rights table associated with the user identifier, application identifier, the data command; verifying data access authorization for the first application based on a second permission stored in an application-storage rights table associated with the namespace identifier and data command; executing the data command to read from or write data to a data storage interfaced with the computing device associated with the namespace identifier.

16 Claims, 4 Drawing Sheets

(56) References Cited

U.S. PATENT DOCUMENTS

| | | | |
|---|---|---|---|
| 2012/0284702 A1* | 11/2012 | Ganapathy | G06F 21/6218 |
| | | | 717/174 |
| 2012/0311697 A1* | 12/2012 | Swingler | G06F 21/6218 |
| | | | 726/17 |
| 2014/0096237 A1* | 4/2014 | Takayanagi | H04L 63/101 |
| | | | 726/17 |
| 2017/0116375 A1* | 4/2017 | Kuwayama | H04L 63/10 |
| 2017/0147667 A1* | 5/2017 | Boss | G06F 3/04817 |
| 2017/0163635 A1* | 6/2017 | Hirata | H04L 63/0807 |
| 2018/0246675 A1* | 8/2018 | Qiu | G06F 21/62 |

* cited by examiner

METHOD AND SYSTEM FOR APPLICATION-BASED MANAGEMENT OF USER DATA STORAGE RIGHTS

FIELD

The present disclosure relates to the controlling of access to data storage based on application rights dictating usage ability of a user, specifically the use of a combination of rights tables to manage user data storage rights as a result of application-based rights for access to data storage and programs associated therewith.

BACKGROUND

The management of rights regarding data storage is often a point of concern and focus for information technology departments of all shapes and sizes. It can often be exceedingly difficult to ensure that every user has sufficient permissions for the various types and locations of data storage in a network, to enable the user to be able to execute all of the functions necessary for their position and to facilitate the use of the application programs necessary for the user to complete their work. In most cases, the result is that a user is provided far more data storage rights than the minimum necessary, in a "better safe than sorry" approach. However, this results in a user having far greater access than needed, which places the exposed data at risk for negative actions related thereto, whether intentional or accidental.

Currently, solutions to improve the situation regarding data storage rights continue to focus on storage rights on a user-by-user basis, such as becoming more specific as to the various storage namespaces involved and data commands related thereto. In many cases, solutions rely on the use of extreme caution, having data storage access rights very limited and provided as-needed, slowly increasing to the absolute minimum point. However, these systems are often laborious, hard to update and adapt any time changes occur, and will frequently eventually lead to users still having far too many permissions than necessary and needing too much management and oversight. Thus, there is a need for a system that improves user data storage rights.

SUMMARY

The present disclosure provides a description of systems and methods for controlling access to data storage based on a combination of application-application rights and application-storage rights that dictate user data storage rights without the need for establishing storage rights on a user-by-user basis. Data storage is accessed through an application program in communication therewith. A first application that interacts with a user has its own rights established with the second application program that accesses the data storage. At the same time, the second application has its own rights established with the data storage. When a user performs a function on the first application that requires access to data storage, the rights of the first application to access the second application, and rights of the second application to access the data storage, are utilized without regarding to any individual rights of the user as related to data storage access. As a result, every user's data storage rights are based on their ability to access and utilize the first application program, negating the need for any individual user data storage access rights. Thus, any updates or modifications to data storage can be performed based on the rights of the applications, without the need for any individualized management of data storage access, significantly reducing the oversight necessary to maintain user data storage rights and providing only the minimum amount of data storage access necessary as a result of the user's application permissions.

A method for controlling access to data storage based on application rights dictating usage ability of a user includes: receiving, by a first application program of a computing device, a data access request from a second application program of the computing device, the data access request including at least a user identifier, a namespace identifier, an application identifier associated with the second application program, and a data command; verifying, by the first application program of the computing device, data access authorization for a user of the second application program and for the second application program based on a first permission stored in an application-application rights table, where the first permission is associated with the user identifier, application identifier, and the data command; verifying, by the first application program of the computing device, data access authorization for the first application program based on a second permission stored in an application-storage rights table, where the second permission is associated with the namespace identifier and the data command; executing, by the first application program of the computing device, the data command to read from or write data to a data storage interfaced with the computing device associated with the namespace identifier upon successful verification of the data access authorization for the user and the data access authorization for the first application program.

A system for controlling access to data storage based on application rights dictating usage ability of a user includes: a first application program; a second application program; a computing device storing the first application program and the second application program; and a data storage interfaced with the computing device, wherein the first application program receives a data access request from a second application program of the computing device, the data access request including at least a user identifier, a namespace identifier, an application identifier associated with the second application program, and a data command, verifies data access authorization for a user of the second application program and for the second application program based on a first permission stored in an application-application rights table, where the first permission is associated with the user identifier, application identifier, and the data command, verifies data access authorization for the first application program based on a second permission stored in an application-storage rights table, where the second permission is associated with the namespace identifier and the data command, and executes the data command to read from or write data to the data storage interfaced with the computing device associated with the namespace identifier upon successful verification of the data access authorization for the user and the data access authorization for the first application program.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Application-Based Control of User Data Storage Rights

Figure 1:
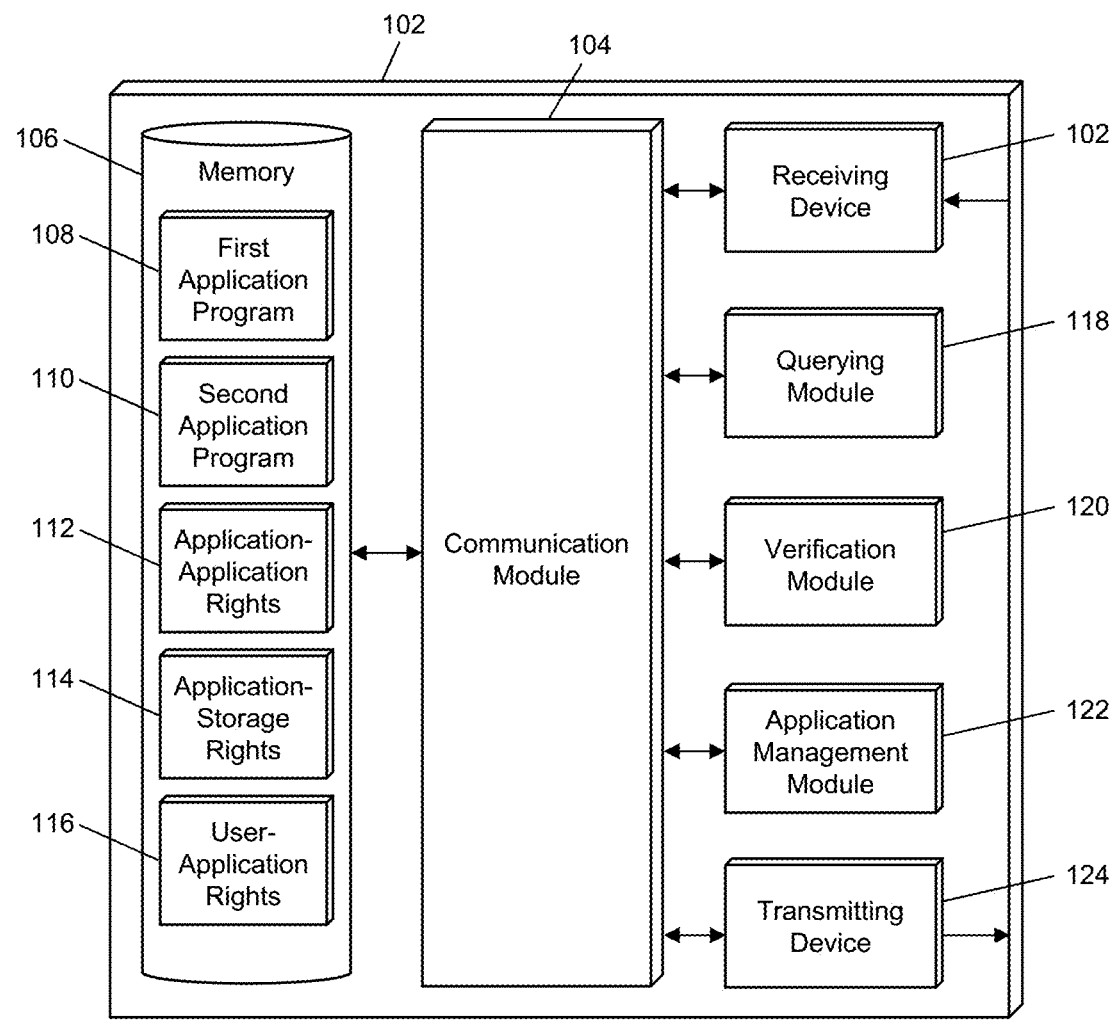
FIG. 1 is a block diagram illustrating a high level architecture of a computing device configured to control access to data storage based on application rights in accordance with exemplary embodiments.

FIG. 1 illustrates an embodiment of a computing device 100. It will be apparent to persons having skill in the relevant art that the embodiment of the computing device 100 illustrated in FIG. 1 is provided as illustration only and may not be exhaustive to all possible configurations of the computing device 100 suitable for performing the functions as discussed herein. For example, the computer system 400 illustrated in FIG. 4 and discussed in more detail below may be a suitable configuration of the computing device 100.

The computing device 100 may be comprised of a plurality of modules, engines, devices, memories, and other components that are specially configured for the performing of the functions as discussed herein, including the monitoring of access to a data storage device 106 as a memory of the computing device 100 and use of the data stored therein. The data storage device 106 may be any type of device suitable for the storage of data, including a hard disk drive, solid state drive, compact disc, digital video disc, magnetic tape, etc. The data storage device 106 may include a host controller or other application program that may be implemented in hardware, software, or a combination thereof in the data storage device 106 that is configured to read and write data in the data storage device 106. The host controller may be configured to perform any functions related to access and modification of data stored in the data storage device 106, including the prevention of access to one or more data files, sectors, or blocks in the data storage device 106, the locking of sectors or blocks from modification, the reading or writing of raw or processed data, etc. As discussed herein, actions performed in the computing device 100 with respect to data stored in the data storage device 106 may be executed by or in conjunction with the host controller. The host controller may be configured to operate at the data storage level of the computing device 100. In other words, the computing device 100 may include an operating system (OS) application, which may be executed by a processing device of the computing device 100 to provide an interface to a user of the computing device 100 and a platform on which software application programs may run, where the host controller may operate separately from the OS application. For instance, the OS application may, via a communication module 104, discussed in more detail below, access the data storage device 106 by talking to (e.g., exchanging communications with) the host controller thereof. For example, the OS application may be stored in the data storage device 106 as program code and may access its own files or files used by application programs executed on the OS by requesting corresponding data from the host controller.

In some embodiments, the computing device 100 may include a separate memory in addition to the data storage device 106. The memory may be a separate data storage device that may be read-only, random access, or other type of memory that may be used by the computing device 100 in the execution and use of the OS application. In some cases, the host controller may be configured to operate as the host controller of the memory as well, or may be otherwise configured to monitor access to and usage of data stored in the memory. The memory may be configured to store data for use by the computing device 100 in performing functions discussed herein. The memory, as well as the data storage device 106, may be configured to store data using suitable data formatting methods and schema and may be any suitable type of memory. The memory may include, for example, encryption keys and algorithms, communication protocols and standards, data formatting standards and protocols, program code for modules and application programs of the processing device, and other data that may be suitable for use by the computing device 100 in the performance of the functions disclosed herein as will be apparent to persons having skill in the relevant art. In some embodiments, the memory may be comprised of or may otherwise include a relational database that utilizes structured query language for the storage, identification, modifying, updating, accessing, etc. of structured data sets stored therein. In some instances, the memory may be external to the computing device 100, such as part of a remote computing system that is external to, but in communication with, the computing device 100.

The data storage device 106 (e.g., and/or separate memory, as applicable) may include one or more first application programs 108. A first application program 108 may be configured to access data stored in the data storage device 106. For instance, the first application program 108 may be the host controller of the data storage device 106 or may be otherwise in communication with the host controller for the access of other data stored in the data storage device 106. The first application program 108 may be configured to read raw data, read processed data, and write data to various namespaces in the data storage device 106, and perform any additional functions as will be apparent to persons having skill in the relevant art.

The data storage device 106 may also include one or more second application programs 110. Second application programs 110 may be application programs that are not configured to directly access data stored in the data storage device 106, but may access data through first application programs 108. For instance, second application programs 110 may be programs that are accessed and utilized by a user of the computing device 100, where the second application programs 110 may communicate data commands to first application programs 108 for the access of data storage namespaces as part of the use of the second application program 110. For instance, in an example, the first application program 108 may be a host controller and the second application program 110 may be a photo editing program, where the photo editing program submits read or write commands to the host controller for use in reading or writing data to namespaces in the data storage device 106.

As discussed herein, data storage access rights may be application-based in the computing device 100 as opposed to user-based. The data storage device 106 may include an application-application rights table 112. The application-application rights table 112 may include data regarding the rights of a second application program 110 with respect to a first application program 108. For instance, the application-application rights table 112 may include information regarding the rights of a second application program 110 to read or write raw or processed data, as may be associated with a first application program 108 on a first application program-by-program basis. For instance, in the above example, the photo editing software may be allowed to read processed data and write data through the host controller, while a separate word processing application may only be allowed to read raw data from the host controller. The following is an example of an application-application rights table 112 that may be stored in the data storage device 106:

| Application Identifier | Allow Write | Allow Read (Raw) | Allow Read (Processed) |
|---|---|---|---|
| KL367988-9843-V3ND | Yes | No | Yes |
| 64KFDG09-4729-IT03 | No | Yes | No |

In some cases, each first application program 106 may have its own application-application rights table 112, which may be stored therein. In some instances, an external computing system, such as a remote server, may store the application-application rights tables 112, where each may be associated with a first application program 108, such as through a unique identifier associated therewith. Each application program discussed herein may have a unique identifier associated therewith, referred to herein as an application identifier, such as illustrated in the example application-application rights table 112 above. In some embodiments, each entry in the application-application rights table 112 may also include a user identifier, which may be unique to a user of the computing device 100. In such embodiments, the rights of each second application program 110 with respect to a first application program 108 may be further based on the rights of individual users when using the second application program 110.

The data storage device 106 may also include an application-storage rights table 114. The application-storage rights table 114, which may be stored in the first application program 108 or other data storage (e.g., the data storage device 106, an external memory, such as in a remote server, etc.), may store rights regarding a first application program 108 to execute data commands related to various namespaces in the data storage device 106 and other memories of the computing device 100 or accessible thereby. Each entry in the application-storage rights table 114 may thus be related to a first application program and a storage namespace and also include information regarding the rights of the first application program to execute commands on the associated storage namespace. The following is an example of an application-storage rights table 114 that may be stored in the data storage device 106:

| Application Identifier | Namespace Identifier | Allow Write | Allow Read |
|---|---|---|---|
| 44KAF943-5N43-NRF9 | K435439M-GVR9-GI54 | Yes | No |
| 44KAF943-5N43-NRF9 | LJ546549-UYGH-50UG | Yes | Yes |

As illustrated in the above, an entry application-storage rights table may include an application identifier for the first application program 108, a unique identifier for the storage namespace, referred to herein as a namespace identifier, and an indication of the rights of the first application program 108 to execute read or write commands on the storage namespace. In the above example, the photo editing software may be the application identified as "KL367988-9843-V3ND" and the host controller may be the application identified as "44KAF943-5N43-NRF9," where the tables indicate that the photo editing software can write data and read processed data through the host controller, where the host controller can only write data to the first storage namespace, but can read and write data from the second storage namespace.

In some embodiments, the data storage device 106 may also include a user-application rights table 116. The user-application rights table 116, which may be a part of second application programs 110 or other computing systems or memories as discussed herein, may store data regarding the rights of users of the computing device 100 with respect to second application programs 110. For instance, in the above example, the user-application rights table 116 may store information regarding if each user of the computing device 100 is able to use the photo editing program or the word processor program. The following is an example of the user-application rights table 116 that may be stored in the data storage device 106:

| User Identifier | Application Identifier | Allow? |
|---|---|---|
| 12345678 | KL367988-9843-V3ND | Yes |
| 12345678 | 64KFDG09-4729-IT03 | No |

In the example table, each entry in the user-application rights table 116 may be related to a user of the computing device 100, including a unique identifier associated with that user, referred to herein as a user identifier, and a second application program 110 as referenced by its application identifier, and indicate whether or not the user has rights to use that second application program. In the above example, the user may have rights to use the photo editing software, but not the word processing application.

The computing device 100 may also include a receiving device 102. The receiving device 102 may be configured to receive data over one or more networks via one or more network protocols. In some instances, the receiving device 102 may be configured to receive data from other computing systems that may be located on a local network of the computing device 100 or external to the computing system via one or more communication methods, such as radio frequency, local area networks, wireless area networks, cellular communication networks, Bluetooth, the Internet, etc. In some embodiments, the receiving device 102 may be comprised of multiple devices, such as different receiving devices for receiving data over different networks, such as a first receiving device for receiving data over a local area network and a second receiving device for receiving data via the Internet. The receiving device 102 may receive electronically transmitted data signals, where data may be superimposed or otherwise encoded on the data signal and decoded, parsed, read, or otherwise obtained via receipt of the data signal by the receiving device 102. In some instances, the receiving device 102 may include a parsing module for parsing the received data signal to obtain the data superimposed thereon. For example, the receiving device 102 may include a parser program configured to receive and transform the received data signal into usable input for the functions performed by the processing device to carry out the methods and systems described herein.

The computing device 100 may also include a transmitting device 124. The transmitting device 124 may be configured to transmit data over one or more networks via one or more network protocols. In some instances, the transmitting device 124 may be configured to transmit data to computing systems that may be located on a local network of the computing device 100 or external to the computing system via one or more communication methods, local area networks, wireless area networks, cellular communication, Bluetooth, radio frequency, the Internet, etc. In some embodiments, the transmitting device 124 may be comprised of multiple devices, such as different transmitting devices for transmitting data over different networks, such as a first transmitting device for transmitting data over a local area network and a second transmitting device for transmitting data via the Internet. The transmitting device 124 may electronically transmit data signals that have data superimposed that may be parsed by a receiving computing device. In some instances, the transmitting device 124 may include one or more modules for superimposing, encoding, or otherwise formatting data into data signals suitable for transmission.

The computing device 100 may also include a communication module 104. The communication module 104 may be configured to transmit data between modules, engines, databases, memories, and other components of the computing device 100 (e.g., which may also be referred to as "devices" or "host devices" of the computing device 100) for use in performing the functions discussed herein. The communication module 104 may be comprised of one or more communication types and utilize various communication methods for communications within a computing device. For example, the communication module 104 may be comprised of a bus, contact pin connectors, wires, etc. In some embodiments, the communication module 104 may also be configured to communicate between internal components of the computing device 100 and external components of the computing device 100, such as externally connected databases, display devices, input devices, etc. The computing device 100 may also include a processing device. The processing device may be configured to perform the functions of the computing device 100 discussed herein as will be apparent to persons having skill in the relevant art. In some embodiments, the processing device may include and/or be comprised of a plurality of engines and/or modules specially configured to perform one or more functions of the processing device. As used herein, the term "module" may be software or hardware particularly programmed to receive an input, perform one or more processes using the input, and provides an output. The input, output, and processes performed by various modules will be apparent to one skilled in the art based upon the present disclosure.

For instance, the computing device 100 may include a querying module 118. The querying module 118 may be configured to execute queries on the data storage device 106 or other memories or data storage in or otherwise accessible by the computing device 100, such as for related to data storage access. For instance, the querying module 118 may be a module utilized by host controllers for the executing of data commands related to storage namespaces in the data storage device 106 and other memories of the computing device 100. In another example, the querying module 118 may be configured to execute queries on the rights tables in the data storage device 106 to determine the rights of a first application program 108 or second application program 110 regarding data storage access. For instance, when a user enters a command in the second application program 110, the querying module 118 may query the application-application rights table 112 to determine which, if any, first application programs 108 that the second application program 110 can utilize to execute the requested command, and to query the application-storage rights table 114 to determine if the first application program 108 has sufficient rights to any, or a specific, as necessary, storage namespace to execute the requested command.

The computing device 100 may also include a verification module 120. The verification module 120 may be configured to perform verifications of the computing device 100, such as with respect to the rights of users, first application programs 108, and second application programs 110 regarding requested data commands and storage namespaces. For instance, when the querying module 118 performs queries to identify the rights regarding users and application programs, the verification module 120 may analyze the rights with respect to a requested data commands to verify if the data command may be executed or is prohibited based on the rights as indicated in the rights tables in the data storage device 106. For instance, in the above example, the requested data command may be a command from the photo editing software to write data in any available namespace, where the host controller may be able to successfully do so in either namespace.

The computing device 100 may also include an application management module 112. The application management module 112 may be a part of the first application program 108, second application program 110, or other application of the computing device 100 that is configured to perform management regarding rights in the rights tables as discussed herein. For instance, a first application program 108 may use the application management module 112 to update rights regarding its own ability to access storage namespaces (e.g., stored in the application-storage rights table 114) or the ability of second application programs 110 to use the first application program 108 (e.g., stored in the application-application rights table 112), or the second application program 110 may use the application management module 112 to update rights regarding users to access the application program (e.g., stored in the user-application rights table 116).

Process for Controlling Access to Data Storage

Figure 2:
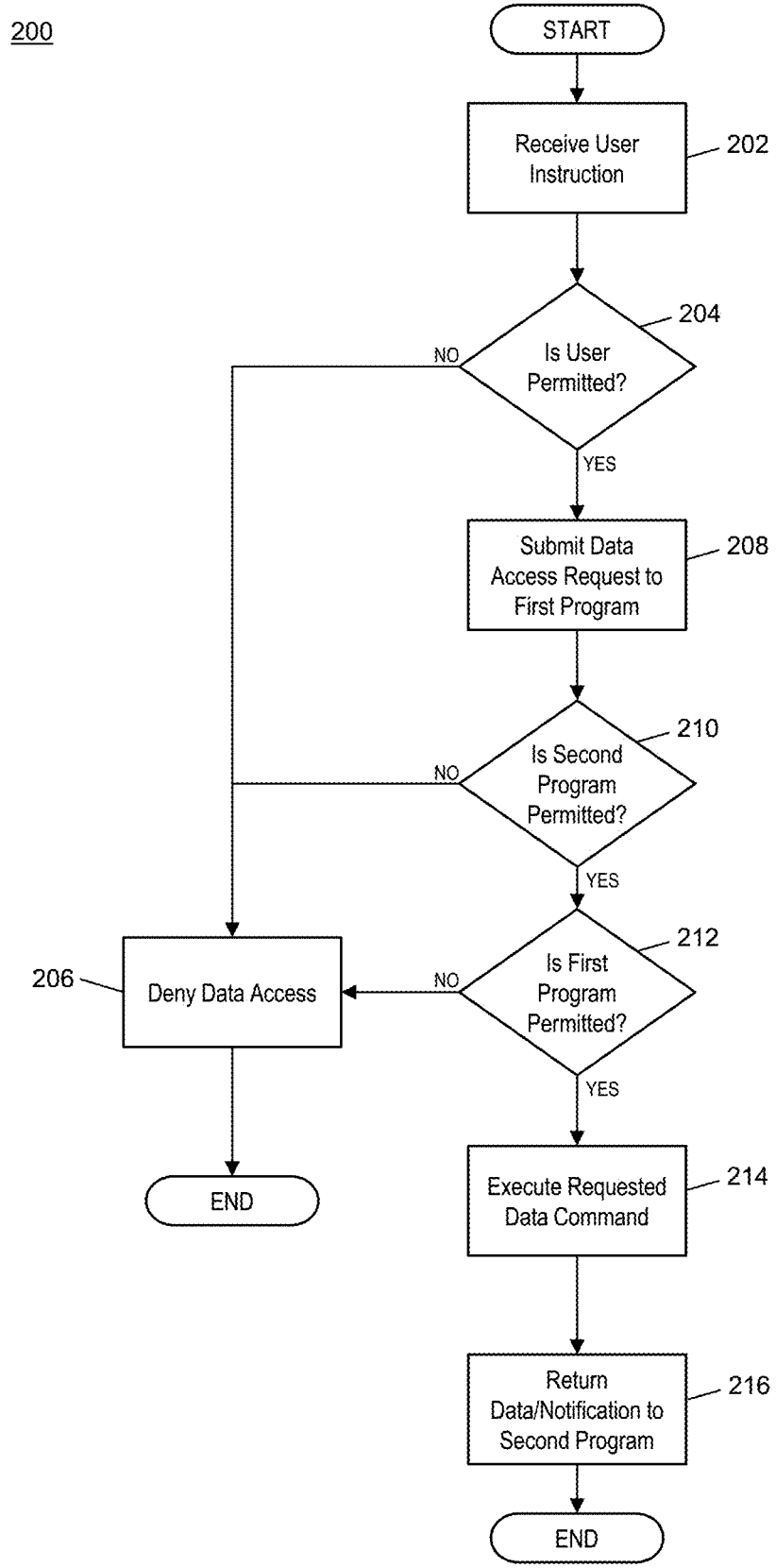
FIG. 2 is a flow diagram illustrating a process for controlling access to data storage rights based on application rights as executed by the computing device in FIG. 1 in accordance with exemplary embodiments.

FIG. 2 illustrates a process 200 executed by the computing device 100 of FIG. 1 to control access to storage namespaces in the data storage device 106 using application-based rights as an alternative to data storage rights that are specific on a user-by-user basis. The process 200 discussed below and illustrated herein is exemplary, where alternative processes for accomplishing the functions discussed herein of the computing device 100 may be utilized as will be apparent to persons having skill in the relevant art.

In step 202, a second application program 110 (e.g., the photo editing software) may receive an instruction from a user of the computing device 100. For instance, the user with the user identifier 12345678 may request to read processed data from a specific storage namespace, such as reading a saved data file stored in the storage namespace identified as LJ546549-UYGH-50UG (e.g., which may be identified through a user interface that enables the user to select the data file in a directory structure provided by the operating system utilized by the computing device 100). In step 204, the second application program 110 or other program in the computing device 100 or accessible thereby, such as a remote server used to control data storage access, may determine if the user is permitted to access the second application program 110 as requested. The determination may be based on a query of the user-application rights table 116 and a verification performed thereon, to check to see if there is an entry in the user-application rights table 116 for user 12345678 and application KL367988-9843-V3ND and if the entry indicates that the user is allowed to use the application.

If the user is not allowed to use the application program indicated in the instruction, then, in step 206, execution of the data command may be denied. Denial of the data command may result in a notification being displayed on the computing device 100, the transmission of a notification message to a suitable display device, or other indication that is communicated to the user, either directly or via the second application program 110, that indicates that the requested data command cannot be executed. In some cases, a reason for the denial may be provided, such as by informing the user that they do not have sufficient rights in the second application program 110. If the user is allowed to use the second application program 110, then, in step 308, the second application program may transmit a data access request to a first application program 108, such as by the photo editing software requesting the host controller to read the data file in the storage namespace as identified in the user instruction. The data access request may include at least the data command to be executed (e.g., a read command of a specific storage namespace and the data file or memory location to be read), the application identifier for the second application program 110, and, if applicable, the user identifier for the user.

In step 210, the computing device 100 (e.g., or remote server, as applicable) may determine if the second application program 110 is permitted to utilize the first application program 108 for the requested data command. The determination may be based on a query of the application-application rights table 112 and a verification to check if there is an entry that includes the application identifier for the second application program 110 in the application-application rights table 112 for the first application program 108 and that the rights indicated therein indicate that there is sufficient permissions for execution of the requested data command. In the above example, the verification module 120 would check to see if there is an entry in the application-application rights table for the photo editing software to read processed data via the host controller.

If, in step 210, it is determined that the second application program 110 does not have sufficient permissions through the first application program 108 for the requested data command, then the process 200 may proceed to step 206 where execution of the data command may be denied. In cases where a reason is provided, the reason may indicate insufficient permissions by the second application program 110 to perform the requested data command. If, in step 210, the second application program 110 has sufficient permissions with the first application program 108 then, in step 212, the computing device 100 (e.g., or remote server, as applicable) may determine if the first application program 108 has sufficient permissions to execute the requested data command on the indicated storage namespace. The determination may be based on a query of the application-storage rights table 114 and a verification to check if there is an entry for the first application program 108 and the indicated storage namespace and that the rights indicated therein provided permission for the first application program 108 to execute the requested data command on the storage namespace.

If, in step 212, it is determined that the first application program 108 cannot execute the requested data command on the indicated storage namespace, then the process 200 may proceed to step 206 where execution of the data command may be denied. In cases where a reason is provided, the reason may indicate insufficient permissions by the first application program 108 to access the storage namespace in the requested manner. If, in step 212, it is determined that the first application program 108 has sufficient permissions with the indicated storage namespace, then, in step 214, the first application program 108 may execute the requested data command. In the above example, the host controller may read the saved data file from the storage namespace LJ546549-UYGH-50UG. In step 216, the first application program 108 may provide information regarding the executed data command to the second application program 110 using the communication module 104 of the computing device 100. For instance, in the above example, the saved data file may be provided to the photo editing software, which may present the saved data file for use by the user of the computing device 100 for viewing or editing of a saved photo. In cases where a write command is requested, the transmission to the second application program 110 may be a notification of successful execution of the data command (e.g., which may be presented to the user with a notification that data was successfully written as requested). The process 200 may then be completed and executed again when a new data command is requested by a user or application program in the computing device 100.

Exemplary Method for Controlling Access to Data Storage

Figure 3:
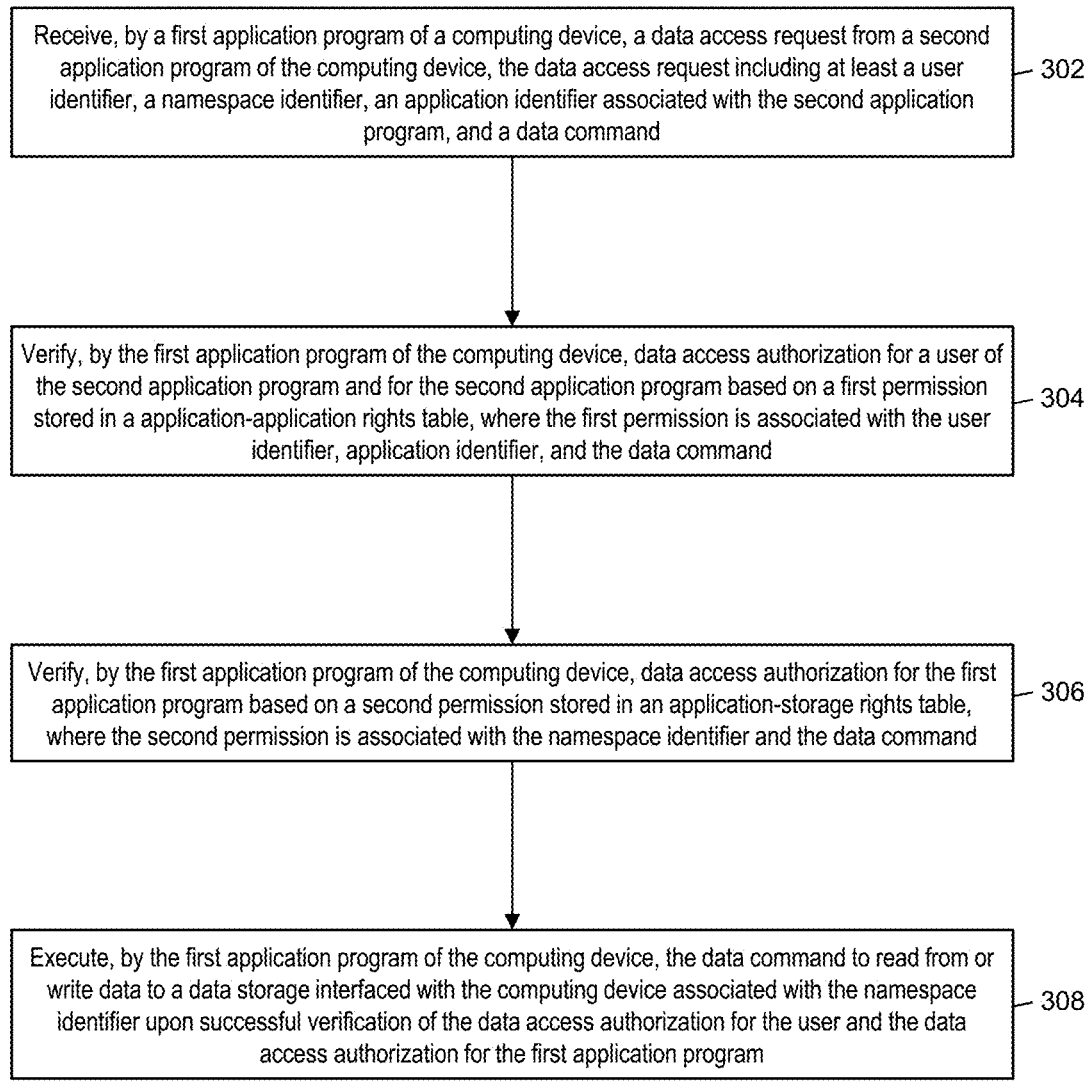
FIG. 3 is a flow diagram illustrating an exemplary method for controlling access to data storage based on application rights dictating usage ability of a user in accordance with exemplary embodiments.

FIG. 3 illustrates a method 300 for controlling access to data storage based on application rights dictating usage ability of a user.

In step 302, a data access requested may be received by a first application program (e.g., first application program 108) of a computing device (e.g., computing device 100) from a second application program (e.g., second application program 110) of the computing device, the data access request including at least a user identifier, a namespace identifier, an application identifier associated with the second application program, and a data command. In step 304, data access authorization for a user of the second application program and for the second application program may be verified by the first application program of the computing device based on a first permission stored in an application-application rights table (e.g., application-application rights table 112), where the first permission is associated with the user identifier, application identifier, and the data command.

In step 306, data access authorization for the first application program may be verified by the first application program of the computing device based on a second permission stored in an application-storage rights table (e.g., application-storage rights table 114), where the second permission is associated with the namespace identifier and the data command. In step 308, the data command may be executed by the first application program of the computing device to read from or write data to a data storage (e.g., data storage device 106) interfaced with the computing device associated with the namespace identifier upon successful verification of the data access authorization for the user and the data access authorization for the first application program.

In one embodiment, the application-application rights table and the application-storage rights table may be stored in the first application program. In some embodiments, the second application program may not have access to the application-application rights table or the application-storage rights table. In one embodiment, the application-application rights table and the application-storage rights table may be stored in a memory of a remote computing system external to the computing device. In a further embodiment, verifying the data access authorization for the user and verifying the data access authorization for the first application program may include transmitting, by a transmitter (e.g., transmitting device 124) of the computing device, a data request to the remote computing system and receiving, by a receiver (e.g., receiving device 102) of the computing device, a data response from the remote computing system.

In some embodiments, the data command may be one of: write, read raw data, and read processed data. In one embodiment, the second permission may be further associated with an application identification value associated with the first application program. In some embodiments, the method 300 may further include verifying, by the second application program of the computing device, application access authorization for the user of second application program with the second application program based on a third permission stored in a user-application rights table (e.g., user-application rights table 116), where the third permission is associated with the user identifier and application identifier, wherein verifying the application access authorization for the user with the second application program may be performed prior to receiving the data access request.

Computer System Architecture

Figure 4:
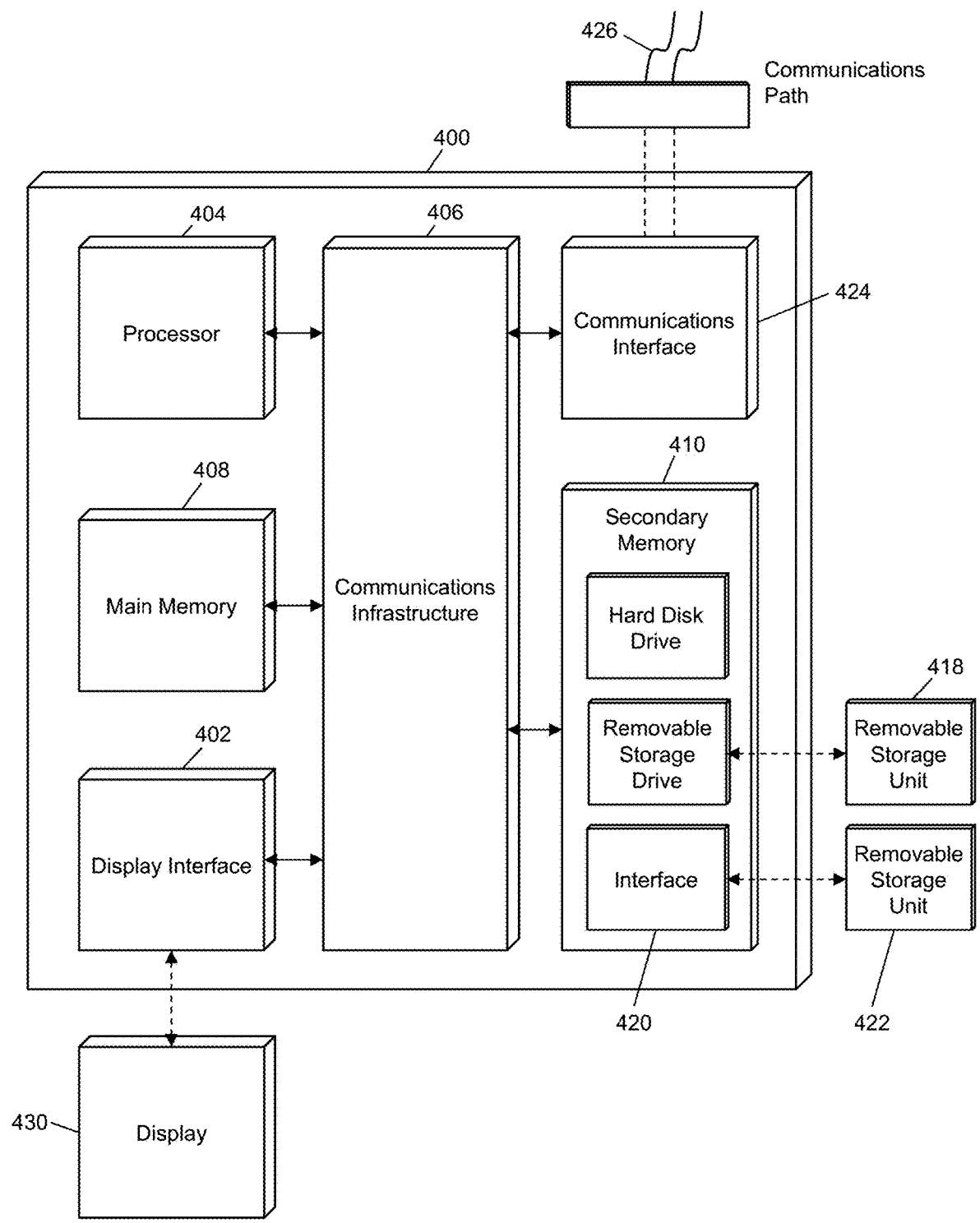
FIG. 4 is a block diagram illustrating a computer system architecture in accordance with exemplary embodiments.

FIG. 4 illustrates a computer system 400 in which embodiments of the present disclosure, or portions thereof, may be implemented as computer-readable code. For example, the computing device 100 of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2 and 3.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIGS. 2 and 3, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for the monitoring and control of data access. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for controlling access to data storage based on application rights dictating usage ability of a user, comprising:

receiving, by a first application program of a computing device, a data access request from a second application program of the computing device, the data access request including at least a user identifier, a namespace identifier, an application identifier associated with the second application program, and a data command;

verifying, by the first application program of the computing device, data access authorization for a user of the second application program and for the second application program based on a first permission stored in an application-application rights table, where the first permission is associated with the user identifier, application identifier, and the data command;

verifying, by the first application program of the computing device, data access authorization for the first application program based on a second permission stored in an application-storage rights table, where the second permission is associated with the namespace identifier and the data command;

executing, by the first application program of the computing device, the data command to read from or write data to a data storage interfaced with the computing device associated with the namespace identifier upon successful verification of the data access authorization for the user and the data access authorization for the first application program.

2. The method of claim 1, wherein the application-application rights table and the application-storage rights table are stored in the first application program.

3. The method of claim 1, wherein the second application program does not have access to the application-application rights table or the application-storage rights table.

4. The method of claim 1, wherein the application-application rights table and the application-storage rights table are stored in a memory of a remote computing system external to the computing device.

5. The method of claim 4, wherein verifying the data access authorization for the user and verifying the data access authorization for the first application program includes transmitting, by a transmitter of the computing device, a data request to the remote computing system and receiving, by a receiver of the computing device, a data response from the remote computing system.

6. The method of claim 1, wherein the data command is one of: write, read raw data, and read processed data.

7. The method of claim 1, wherein the second permission is further associated with an application identification value associated with the first application program.

8. The method of claim 1, further comprising:
verifying, by the second application program of the computing device, application access authorization for the user of second application program with the second application program based on a third permission stored in a user-application rights table, where the third permission is associated with the user identifier and application identifier, wherein
verifying the application access authorization for the user with the second application program is performed prior to receiving the data access request.

9. A system for controlling access to data storage based on application rights dictating usage ability of a user, comprising:
a first application program;
a second application program;
a computing device storing the first application program and the second application program; and
a data storage interfaced with the computing device, wherein
the first application program
receives a data access request from a second application program of the computing device, the data access request including at least a user identifier, a namespace identifier, an application identifier associated with the second application program, and a data command,
verifies data access authorization for a user of the second application program and for the second application program based on a first permission stored in an application-application rights table, where the first permission is associated with the user identifier, application identifier, and the data command,
verifies data access authorization for the first application program based on a second permission stored in an application-storage rights table, where the second permission is associated with the namespace identifier and the data command, and
executes the data command to read from or write data to the data storage interfaced with the computing device associated with the namespace identifier upon successful verification of the data access authorization for the user and the data access authorization for the first application program.

10. The system of claim 9, wherein the application-application rights table and the application-storage rights table are stored in the first application program.

11. The system of claim 9, wherein the second application program does not have access to the application-application rights table or the application-storage rights table.

12. The system of claim 9, further comprising:
a remote computing system external to the computing device including a memory storing the application-application rights table and the application-storage rights table.

13. The system of claim 12, wherein verifying the data access authorization for the user and verifying the data access authorization for the first application program includes transmitting, by a transmitter of the computing device, a data request to the remote computing system and receiving, by a receiver of the computing device, a data response from the remote computing system.

14. The system of claim 9, wherein the data command is one of: write, read raw data, and read processed data.

15. The system of claim 9, wherein the second permission is further associated with an application identification value associated with the first application program.

16. The system of claim 9, wherein
the second application program verifies application access authorization for the user of second application program with the second application program based on a third permission stored in a user-application rights table, where the third permission is associated with the user identifier and application identifier, and
verifying the application access authorization for the user with the second application program is performed prior to receiving the data access request.

* * * * *

UNITED STATES PATENT AND TRADEMARK OFFICE
CERTIFICATE OF CORRECTION

| | |
|---|---|
| PATENT NO. | : 11,182,086 B2 |
| APPLICATION NO. | : 16/925856 |
| DATED | : November 23, 2021 |
| INVENTOR(S) | : Tony Edward Fessel |

It is certified that error appears in the above-identified patent and that said Letters Patent is hereby corrected as shown below:

On the Title Page

Item (73) "Assignee: CIGNET TECHNOLOGY, INC., Fort Myers, Florida" should read --Assignee: CIGENT TECHNOLOGY, INC., Fort Myers, Florida--

Signed and Sealed this
Seventh Day of February, 2023

*Katherine Kelly Vidal*

Katherine Kelly Vidal
*Director of the United States Patent and Trademark Office*